(12) United States Patent
Chopcinski et al.

(10) Patent No.: US 7,403,844 B2
(45) Date of Patent: Jul. 22, 2008

(54) METHOD AND APPARATUS FOR PROGRAMMING PARAMETERS OF A POWER DRIVEN WHEELCHAIR FOR A PLURALITY OF DRIVE SETTINGS

(75) Inventors: Gary E. Chopcinski, North Ridgeville, OH (US); Bruce A. Jaenke, Parma, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 11/511,606

(22) Filed: Aug. 29, 2006

(65) Prior Publication Data
US 2007/0067072 A1    Mar. 22, 2007

Related U.S. Application Data

(60) Provisional application No. 60/727,005, filed on Oct. 15, 2005, provisional application No. 60/726,983, filed on Oct. 15, 2005, provisional application No. 60/726,666, filed on Oct. 15, 2005, provisional application No. 60/726,981, filed on Oct. 15, 2005, provisional application No. 60/726,993, filed on Oct. 15, 2005, provisional application No. 60/727,249, filed on Oct. 15, 2005, provisional application No. 60/727,250, filed on Oct. 15, 2005, provisional application No. 60/712,987, filed on Aug. 31, 2005.

(51) Int. Cl.
*G05D 1/00* (2006.01)

(52) U.S. Cl. .......................... 701/22; 701/36; 180/65.8

(58) Field of Classification Search .................... 701/1, 701/22, 36; 180/65.8
See application file for complete search history.

(56) References Cited

U.S. PATENT DOCUMENTS

| | | | |
|---|---|---|---|
| 5,248,007 | A | 9/1993 | Watkins et al. |
| 5,547,038 | A | 8/1996 | Madwed |
| 5,794,730 | A | 8/1998 | Kamen |
| 5,961,561 | A | 10/1999 | Wakefield, II |
| 6,154,690 | A | 11/2000 | Coleman |
| 6,425,635 | B1 | 7/2002 | Pulver |
| 6,816,762 | B2 | 11/2004 | Hensey et al. |
| 6,819,981 | B2 | 11/2004 | Wakefield, II et al. |

(Continued)

FOREIGN PATENT DOCUMENTS

| | | |
|---|---|---|
| DE | 3923937 A1 | 1/1990 |
| EP | 0345785 A2 | 12/1989 |
| EP | 0436103 A2 | 7/1991 |
| EP | 1148394 A2 | 10/2001 |
| GB | 2222701 A | 3/1990 |
| WO | WO 03/034967 | 5/2003 |
| WO | 2005/037168 A1 | 4/2005 |
| WO | WO 2005/032924 | 4/2005 |
| WO | WO 2005/039473 | 5/2005 |
| WO | WO 2005/039930 | 5/2005 |

OTHER PUBLICATIONS

Dynamic, DX Remote Joystick Module (RJM) Installation Manual, No. 60014, iss. 4, Apr. 1997, 13 pgs.

(Continued)

*Primary Examiner*—Mark Hellner
(74) *Attorney, Agent, or Firm*—Calfee, Halter & Griswold LLP

(57) ABSTRACT

A method of programming parameters of a power driven wheelchair for a plurality of drive modes comprises: displaying a menu image on an interactive display screen, the menu image including settings of a plurality of wheelchair parameters for a plurality of drive modes of the wheelchair; selecting a wheelchair parameter for a drive mode from the displayed menu image; and programming the setting of the selected wheelchair parameter to a desired setting.

31 Claims, 9 Drawing Sheets

U.S. PATENT DOCUMENTS

| | | | |
|---|---|---|---|
| 6,866,107 | B2 | 3/2005 | Heinzmann et al. |
| 6,868,931 | B2 | 3/2005 | Morrell et al. |
| 6,871,122 | B1* | 3/2005 | Wakefield, II .................. 701/1 |
| 6,874,591 | B2 | 4/2005 | Morrell et al. |
| 6,926,106 | B2 | 8/2005 | Richey, II et al. |
| 6,989,642 | B2 | 1/2006 | Wakefield, II et al. |
| 7,003,381 | B2 | 2/2006 | Wakefield, II |
| 7,148,638 | B2 | 12/2006 | Wakefield, II |
| 2003/0109973 | A1 | 6/2003 | Hensey et al. |
| 2004/0002305 | A1 | 1/2004 | Byman-Kivivuori et al. |
| 2004/0094936 | A1 | 5/2004 | Koerlin |
| 2004/0195173 | A1* | 10/2004 | Huang et al. ................ 210/490 |
| 2004/0210351 | A1* | 10/2004 | Wakefield et al. ............. 701/1 |
| 2004/0227728 | A1 | 11/2004 | McAlindon |
| 2004/0252341 | A1* | 12/2004 | Adachi et al. ............. 358/1.18 |
| 2004/0259591 | A1 | 12/2004 | Grams et al. |
| 2005/0075758 | A1 | 4/2005 | Wakefield, II |
| 2005/0076308 | A1 | 4/2005 | Mansell et al. |
| 2005/0080518 | A1 | 4/2005 | Wakefield, II |
| 2005/0082995 | A1 | 4/2005 | Wakefield, II et al. |
| 2005/0195173 | A1* | 9/2005 | McKay ....................... 345/173 |
| 2005/0236208 | A1 | 10/2005 | Runkles et al. |
| 2005/0236217 | A1 | 10/2005 | Koelin et al. |
| 2006/0247836 | A1* | 11/2006 | Mansell et al. ................ 701/36 |

OTHER PUBLICATIONS

Dynamic, DX Attendant Control Unit (ACU) Installation Manual, No. 60013, issue 4, Nov. 1998, 30 pgs.

Dynamic, DX Dolphin Remote (DX-Rem34) Installation Manual, No. 60025, issue 5, Jan. 1999, 69 pgs.

Dynamic, DX Two Actuator Module (TAM) Installation Manual, No. 60026, issue 5, Jul. 1998, 45 pgs.

Dynamic, DX-REMG90, DX-REMG90A, DX-REMG90T Master Remotes Installation Manual, GBK64048, issue 1, Jan. 2005, 61 pgs.

Dynamic, DX Power Module (PMB, PMB1, PMB2, PMB-S) Installation Manual, No. 63824, issue 2, Jul. 1998, 85 pgs.

Dynamic, DX-GB, The Complete Gearless Brushless DC Control System brochure, 2 pgs., date unknown.

Dynamic, Actuator Remote Control Module DX-ARC5 Installation Manual, copyright Jun. 2004, 10 pgs.

Flash, New and Notable Product Design, p. 28 from Design News Oct. 10, 2005.

Invacare Corporation—Brochure "Invacare Storm Series TDX Power Wheelchairs, including Formula Powered Seating", Form No. 03-018, rev. Jul. 2004, 32 pgs.

Invacare Corporation—Brochure—"Invacare Tarsys Series Powered Seating Systems", Form No. 00-313, rev. Sep. 2002, 16 pgs.

Invacare Corporation—Brochure—"Storm Series Power Wheelchairs including Fomula CG Powered Seating, MK6i Electronics", 16 pgs., 2006, Form No. 06-040.

Invacare, Owner's Operator and Maintenance Manual, Formula, CG Powered Seating Tilt Only, 48 pgs., Part No. 1143155, dated Jun. 30, 2006.

Invacare, 3G Storm Series Wheelchair Bases, Arrow RWD, Torque SP RWD, Ranger X RWD, dated Jun. 30, 2006, 88 pgs. Part No. 1143151.

Linak, Product Data Sheet, Actuator LA30, 8 pgs, Chapter 2.1, copyright May 2002.

Linak, Product Data Sheet, Actuator LA31, 8 pgs, Chapter 5.8.2, copyright May 2005.

Mechanical Engineering magazine article "Taking sensors out of motors" 5 pgs printed Aug. 15, 2006 http://www.memagazine.org/backissues/january98/features/sensout/sensout.html.

PG Drives Technology—R-Net Rehab-Powerchair Control System (Presentation) pp. 30, date unknown.

Quantum Rehab Innovative Rehab Solutions, a division of Pride Mobility Products Corp., one page brochure, Q-Logic Drive Control System, QLOGIC-Mar. 13, 2006.

Quantum Rehab Innovative Rehab Solutions, a division of Pride Mobility Products Group, Q controls, page from http://www.pridemobility.com/quantum/Electronics/Q_Controls/q_controls.html, printed Jun. 9, 2006.

Teknic, Inc., "The price/performance leader for OEM machine automation", Investigating Servo Architectures, 14 pgs. printed Aug. 15, 2006 from http://www.teknic.com/systems/.

MK5 Electronics Top 10 Application Features, 2005 Spring Update, 10 pgs.

PCT/US2006/033963, PCT International Search Report, mailed May 4, 2007.

PCT/US2006/033963, PCT Written Opinion of the International Searching Authority, mailed May 4, 2007.

Quickie HHP Programming Tree, Sunrise Medical, Inc., Longmont, Colorado (7 pages).

Specialty Control Set up & Programming Guide, QR-SCM Owner's Manual, Quickie Electronics Platform powered by Delphi, Sunrise Medical, Inc., Longmont, Colorado, 101748 Rev. A, 2006 (15 pages).

QR-ED Owner's Manual, Quickie Enhanced Display, Sunrise Medical, Inc., Longmont, Colorado, 101519 Rev. A, 2006 (51 pages).

Service Manual, Quickie Rhythm & Groove, Sunrise Medical, Inc., Longmont, Colorado, 014061 Rev. A, 2006 (104 pages).

Infineon Technologies, "XC164CS 16-Bit Single-Chip Microcontroller", Data Sheet, V2.1, Jun. 2003, 71 pgs.

Int'l App. No. PCT/US06/33964, International Search Report, mailed May 4, 2007, 3 pages.

Int'l App. No. PCT/US06/33964, Written Opinion of the International Searching Authority, mailed May 4, 2007, 10 pages.

Int'l App. No. PCT/US06/33971, International Search Report, mailed Mar. 9, 2007, 4 pages.

Int'l App. No. PCT/US06/33971, Written Opinion of the International Searching Authority, mailed Mar. 9, 2007, 6 pages.

Int'l App. No. PCT/US06/33973, International Search Report, mailed Mar. 16, 2007, 3 pages.

Int'l App. No. PCT/US06/33973, Written Opinion of the International Searching Authority, mailed Mar. 16, 2007, 5 pages.

Int'l App. No. PCT/US06/33978, International Search Report, mailed Jun. 5, 2007, 7 pages.

Int'l App. No. PCT/US06/33978, Invitation to Pay Additional Fees and Communication Relating to the Results of the Partial International Search, Mailed Apr. 5, 2007, 8 pages.

Int'l App. No. PCT/US06/33978, Written Opinion of the International Searching Authority, mailed Jun. 5, 2007, 8 pages.

Int'l App. No. PCT/US06/34149, International Search Report, mailed Jun. 8, 2007, 3 pages.

Int'l App. No. PCT/US06/34149, Written Opinion of the International Searching Authority, mailed Jun. 8, 2007, 7 pages.

* cited by examiner

METHOD AND APPARATUS FOR PROGRAMMING PARAMETERS OF A POWER DRIVEN WHEELCHAIR FOR A PLURALITY OF DRIVE SETTINGS

CROSS-REFERENCE TO RELATED APPLICATIONS

This application claims the benefit of eight U.S. Provisional patent applications, including Ser. No. 60/712,987, filed Aug. 31, 2005 Ser. No. 60/727,005, filed Oct. 15, 2005 Ser. No. 60/726,983, filed Oct. 15, 2005 Ser. No. 60/726,666, filed Oct. 15, 2005 Ser. No. 60/726,981, filed Oct. 15, 2005 Ser. No. 60/726,993, filed Oct. 15, 2005 Ser. No. 60/727,249, filed Oct. 15, 2005 and Ser. No. 60/727,250, filed Oct. 15, 2005. This application is also related to co-pending U.S. utility patent applications: Ser. No. 11/513,740 filed on Aug. 31, 2006 and entitled "Mode Programmable Actuator Controller for Power Positioning Seat or Leg Support of a Wheelchair, "Ser. No. 11/514,016 filed on Aug. 31, 2006 and entitled "Method and Apparatus for Setting or Modifying Programmable Parameter in Power Driven Wheelchair, "Ser. No. 11/513,854 filed on Aug. 31, 2006 and entitled "Context Sensitive Help for Display Device Associated with Power Driven Wheelchair," Ser. No. 11/513,780 filed on Aug. 31, 2006 and entitled "Adjustable Mount for Controller of Power Driven Wheelchair, "Ser. No. 11/513,746 filed on Aug. 31, 2006 and entitled "Method and Apparatus for Automated Positioning of User Support Surfaces in Power Driven Wheelchair, "Ser. No. 11/513,802 filed on Aug. 31, 2006 and entitled "Power Driven Wheelchair," and Ser. No. 11/513,750 filed on Aug. 31, 2006 and entitled "Method and Apparatus for Setting or Modifying Programmable Parameter in Power Driven Wheelchair." The contents of all above-identified patent application(s) and patent(s) are fully incorporated herein by reference.

BACKGROUND

The present invention is directed to power driven wheelchairs, in general, and, more particularly, a method and apparatus for programming parameters of a power driven wheelchair for a plurality of drive settings using a common menu image of an interactive display screen.

Power driven wheelchairs, which may be of the type manufactured by Invacare Corporation of Elyria, Ohio, for example, are generally controlled by an electronic control system. An exemplary control system for power or motor driven wheelchairs is disclosed in U.S. Pat. No. 6,819,981, entitled "Method and Apparatus for Setting Speed/Response Performance Parameters of a Power Driven Wheelchair", issued Nov. 16, 2004, and assigned to the same assignee as the instant application, which patent being incorporated by reference herein in its entirety.

Typically, power driven wheelchairs have a plurality of drive settings for operation of the wheelchair by the user. An exemplary wheelchair may include four drive settings which may be Drive 1 (D1) for indoor operation, Drive 2 (D2) for moderate outdoor operation, Drive 3 (D3) for special operation, and Drive 4 (D4) for ramps and curbs. For each drive setting, there are numerous performance and power seating parameters which are programmed into the control system to satisfy the operational capabilities of the individual user of the wheelchair. The programming task is normally conducted through a hand held programmer unit having an interactive display and coupled to the control system much as described in the above-referenced U.S. Pat. No. 6,819,981, for example.

Currently, a set of parameters may be programmed into the control system through the interactive display of the programmer unit for only one drive setting at a time which renders the task of programming rather time consuming and onerous. It is desired to improve this parameter programming task to permit parameter programming through the interactive display for any drive setting without having to change display screens.

SUMMARY OF THE INVENTION

In accordance with one aspect of the present invention, a method of programming parameters of a power driven wheelchair for a plurality of drive modes comprises: displaying a menu image on an interactive display screen, the menu image including settings of a plurality of wheelchair parameters for a plurality of drive modes of the wheelchair; selecting a wheelchair parameter for a drive mode from the displayed menu image; and programming the setting of the selected wheelchair parameter to a desired setting.

In accordance with another aspect of the present invention, apparatus for programming parameters of a power driven wheelchair for a plurality of drive modes comprises: a display; a controller for interacting with the display and operative to display a menu image on a screen of the display, the menu image including settings of a plurality of wheelchair parameters for a plurality of drive modes of the wheelchair; and a programming unit operative to control the controller to select a wheelchair parameter for a drive mode using the displayed menu image, and to program the setting of the selected wheelchair parameter to a desired setting.

In accordance with yet another aspect of the present invention, apparatus for programming parameters of a power driven wheelchair for a plurality of drive modes comprises: a display; a memory for storing a plurality of menu images, each menu image including settings of a plurality of wheelchair parameters for a plurality of drive modes of the wheelchair; a controller for interacting with the memory and display; and a programming unit operative to control the controller to display a menu image from the plurality of stored menu images on the screen of the display according to a predetermined routing, to select a wheelchair parameter for a drive mode using the displayed menu image, and to program the setting of the selected wheelchair parameter to a desired setting.

BRIEF DESCRIPTION OF THE DRAWINGS

FIGS. 7A and 7B will hereinafter be collectively referred to as FIG. 7.

DETAILED DESCRIPTION

Figure 1:
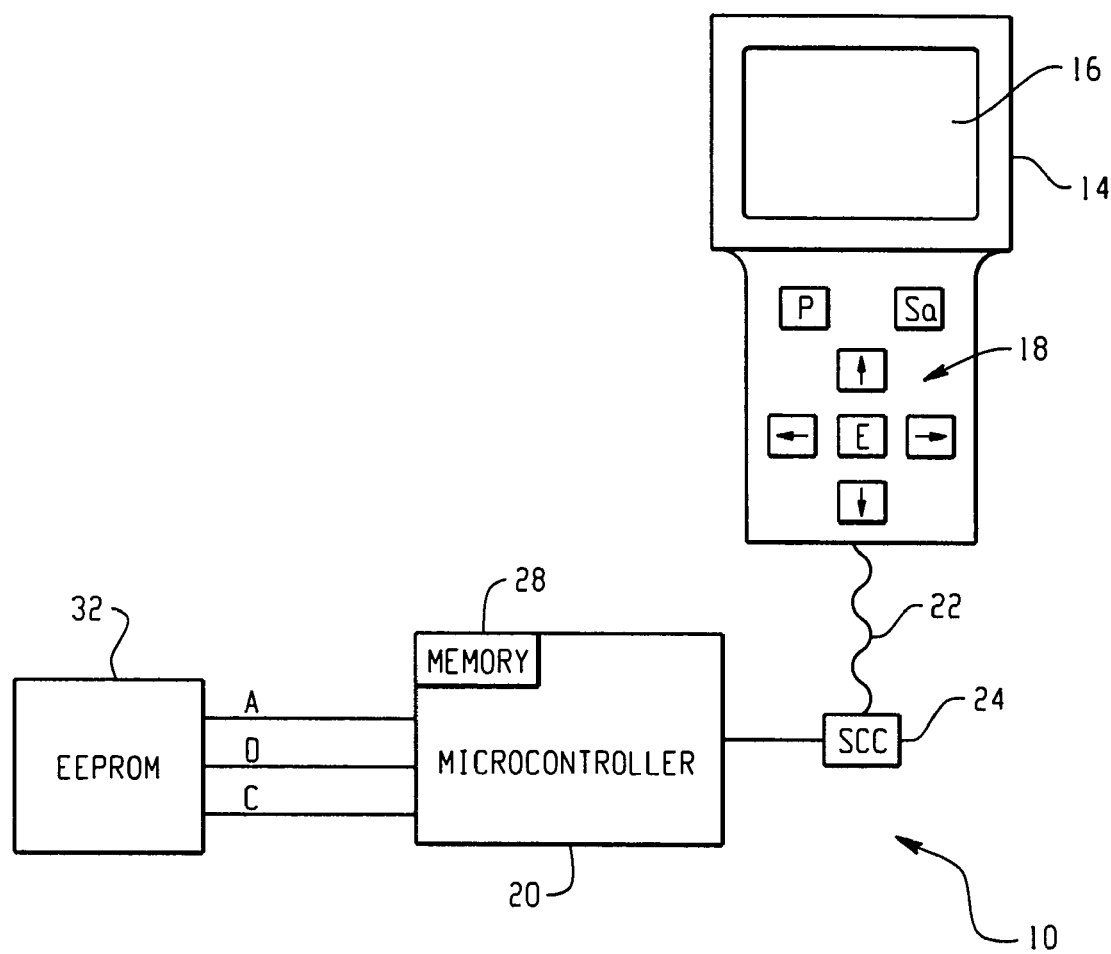
FIG. 1 is a block diagram schematic of an exemplary embodiment for programming parameter values into a control system of a power driven wheelchair.

The block diagram schematic of FIG. 1 illustrates suitable apparatus for embodying the principles of applicants' general concept. Referring to FIG. 1, a remote, hand held programmer unit 14 may be coupled to a control system 10 of the power driven wheelchair and comprises a display screen 16 which may be a liquid crystal display (LCD), for example, and a plurality of pushbuttons 18 for use in selecting the desired drive and parameter and entering the parameter settings, like Speed and Response values, for example, by interacting with the image on the display screen 16 as will become better understood from the description below. More specifically, the pushbuttons 18 may include a Power I/O (P), Save (Sa), Enter (E), left arrow, right arrow, up arrow and down arrow pushbuttons.

In the present exemplary embodiment, the remote programmer unit 14 communicates with a main controller 20 of the control system 10 via serially coded signals over lines 22. The main controller 20 may include a programmed microcontroller, which may be of the type manufactured by Infineon, bearing model no. SAF-XC-164CS, for example. The serial lines 22 may be coupled to the microcontroller 20 through a serial communication controller (SCC) 24 which may be of the type licensed by Echelon Corporation and manufactured by Toshiba bearing model no. TMPN3150, for example. The tasks of the Echelon controller 24 include setting the protocol, performing serial/parallel translations, checking for errors in transmission, and managing the traffic for the serial communication between the remote programmer unit 14 and microcontroller 20. In the alternative, the tasks of the serial communication controller 24 may be programmed into the main controller 20, in which case, the serial lines 22 may be coupled directly to the main controller 20 and the SCC may be eliminated. Moreover, while the communication link between the programmer unit 14 and controller 20 of the exemplary embodiment is over lines 22, it may just as well be a wireless communication link, like a BLUETOOTH link or a 802.11 link, for example, without deviating from the broad principles of applicants' general concept.

The microcontroller 20 may include an internal memory 28 which may be of the random access (RAM) or scratch pad type, for example, and is coupled to an electrically erasable programmable read only memory (EEPROM) 32 over address (A), data (D) and control (C) lines. While the memory 28 is shown internal to the microcontroller 20, it is understood that a portion or all of the memory 28 may be just as well external to the microcontroller 20. Generally, when powered up, the controller 20 will boot up under program control and may access the preset parameters and relationships stored in the EEPROM 32 and store them temporarily to the scratch pad memory 28 for interaction with the remote programmer unit 14 and operation of the wheelchair. It is understood that when power is removed, the stored data of the RAM 28 will be lost. Only, the EEPROM 32 will retain the data of its memory without power.

As indicated above, the microcontroller 20 of the power wheelchair is programmed to interact with the remote programmer unit 14 via signal lines 22 and communication controller 24, if used, for entry of the parameter values or settings and for the display thereof. The flowcharts of FIGS. 2 through 6 exemplify programs for execution by the microcontroller 20 for performing the aforementioned tasks. In describing the various flowcharts herein below, the term block will be used to refer to a step or steps for performing a function or task by the controller 20.

Figure 2:
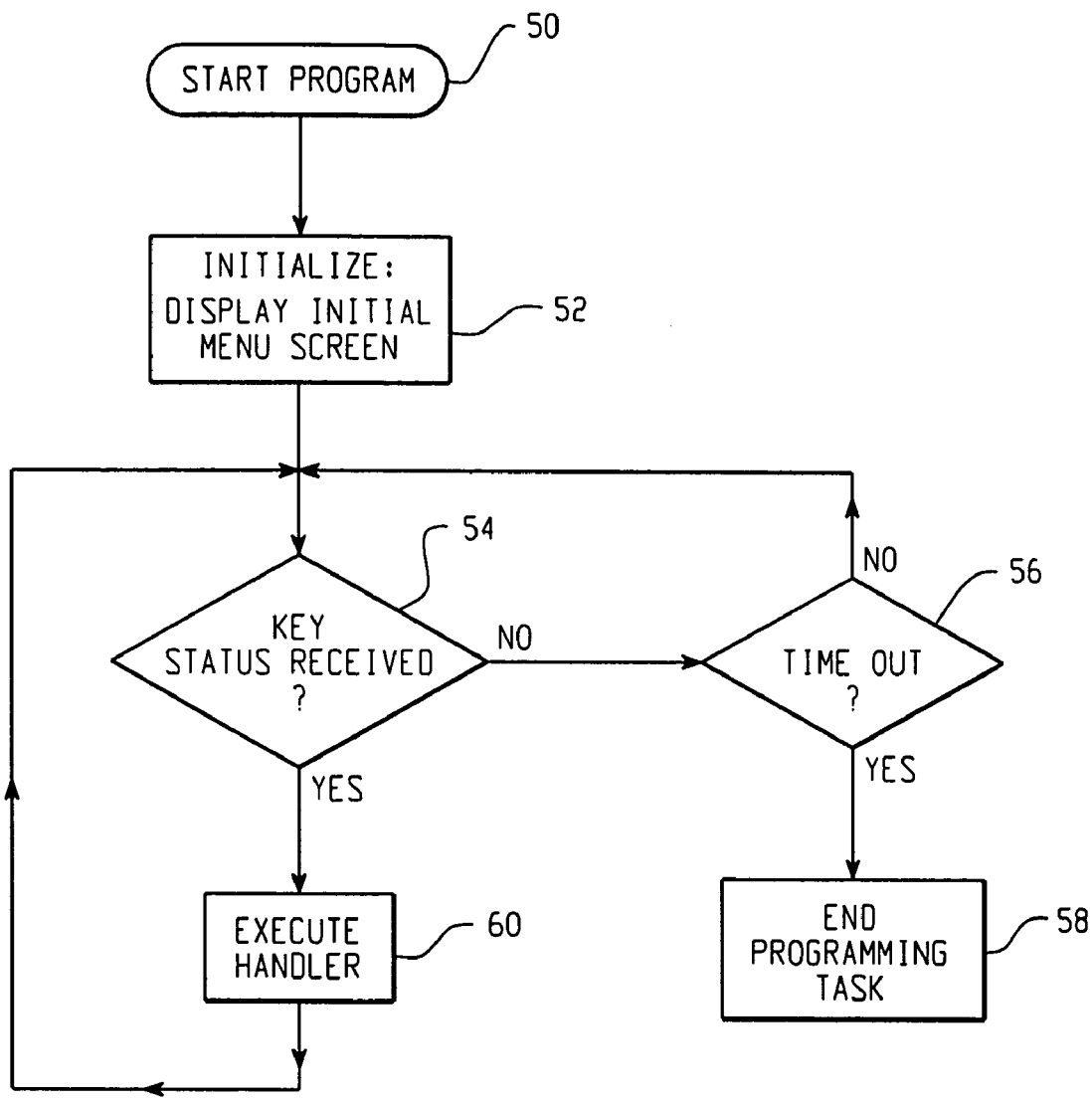
FIGS. 2 through 6 are flowcharts which exemplify programs for execution by a controller for programming parameter values of different drive modes for the control system of the wheelchair.

Referring to FIG. 2, in block 50, the microcontroller 20 responds to the activation (depression) of the P pushbutton of the remote programmer unit 14 by entering the programming task program or parameter setting mode. In the next block 52, the microcontroller 20 initializes the program settings of the parameter setting mode, and then, transmits via lines 22 an initial screen of a main menu image to the programmer unit 14 for display on the LCD screen 16 thereof. The display screen 16 of the programmer unit 14 may be a graphics LCD screen having 160×160 pixels for display, for example.

Figure 1A:
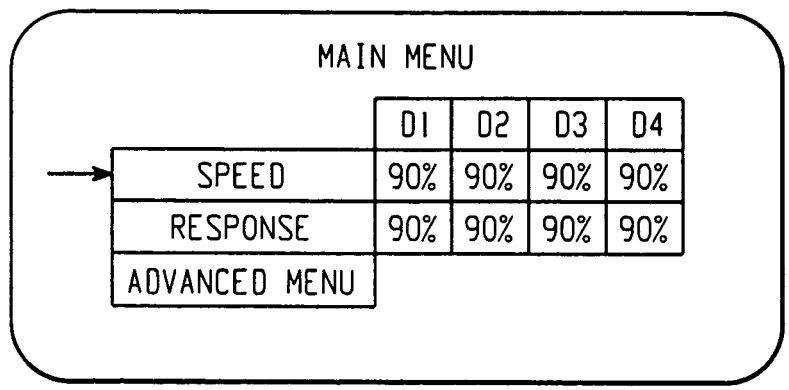
FIG. 1A is an exemplary main menu image for display on an interactive display screen.

An exemplary initial or main menu image screen display in a table format is shown in FIG. 1A. In the present embodiment, the main menu screen image is a table with three rows. The top row of the three includes the parameter word "Speed" in the left most column followed by four columns of the preset parameter values thereof for the drives D1-D4 and the next row down includes the parameter word "Response" in the left most column followed the four columns of the preset parameter values thereof for the drives D1-D4, all of the parameter values being accessed from the EEPROM 32 as described herein above. Note that the Speed and Response parameters may be programmed for all of the drives: D1, D2, D3 and D4 which are displayed in the table format of the main menu screen image. The bottom row of the table may include the text "Advanced Menu" to permit access to a selection menu screen for selection of additional menu screen images for more parameter settings, or, in the alternative, additional rows of the table may be displayed for the direct selection of the additional menu screen images as will become better understood from the description of FIG. 7 infra.

The selection of each row of text may be performed by the movement of a pointer, e.g. an arrow pointer shown to the left of the image (shown to the left of "Speed" in FIG. 1A) or by highlighting the text in some manner or both. Each row position of the pointer is correlated in the microcontroller program with a number. For example, the number 0 may represent the first row or Speed pointer position, the number 1 may represent the second row or Response pointer position, and the number 2 may represent the third row or Advanced Menu pointer position. If the pointer was set to 0 in block 52, for example, a pointer image may appear adjacent to the text "SPEED" in row 1 as shown in FIG. 1A, or the text "SPEED" may be highlighted.

In the present exemplary embodiment, the programmer unit 14 will send a key status signal via lines 22 to the microcontroller 20 every ten (10) milliseconds. Each key status signal will indicate to the program if a pushbutton has been depressed and a code representative of the depressed pushbutton. The program will detect the reception of a key status signal in block 54. If the controller 20 does not receive a key status signal within a preset period of time from the last reception (time out) as determined by block 56, it will presume the programmer has been turned off or has been unplugged from the controller 20 and will end the programming task in block 58.

Figure 3:
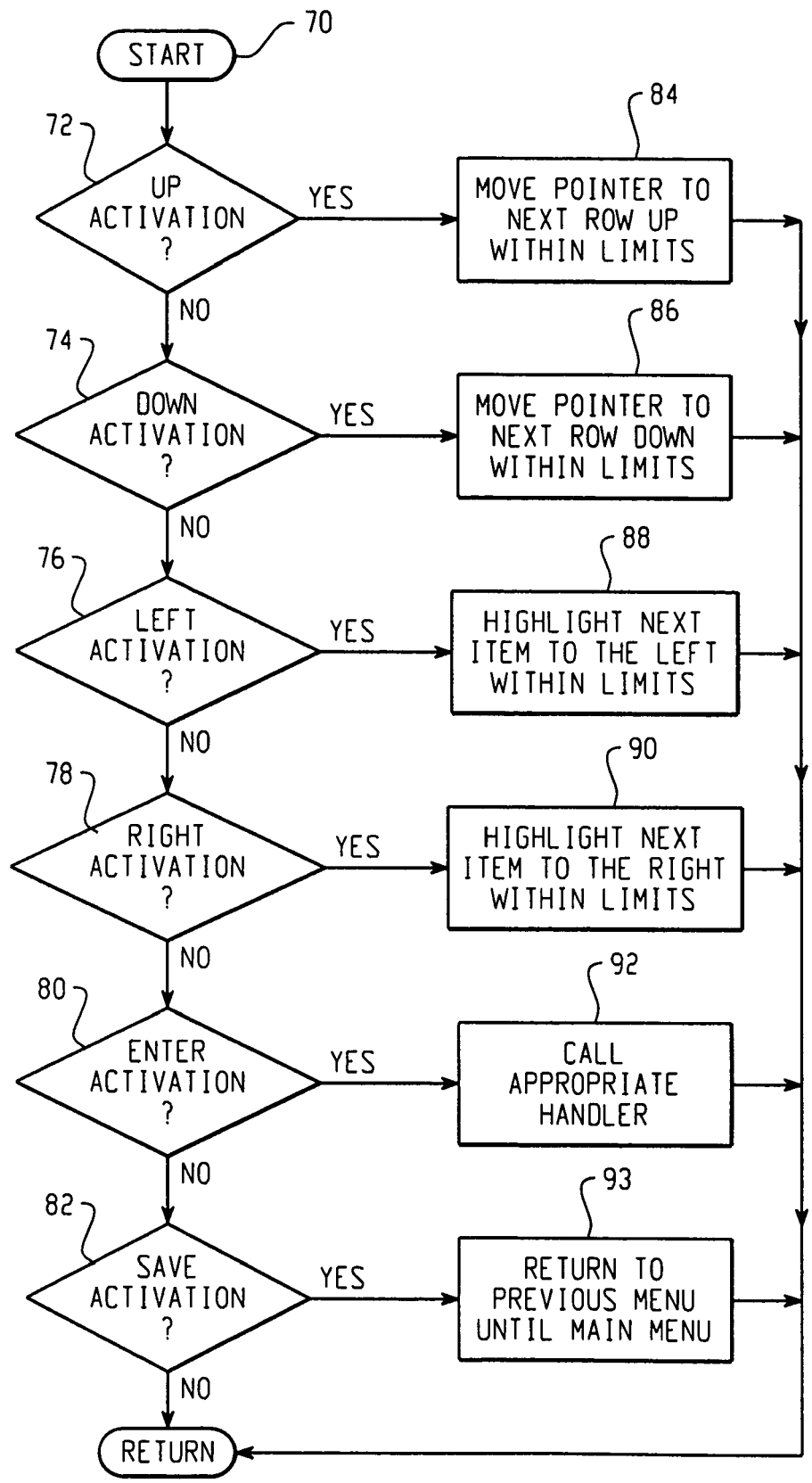

When the program detects the reception of a key status signal in block 54, it calls for the execution of a menu navigation handler program in block 60. An exemplary menu navigation handler program suitable for use in the present embodiment is shown in the flowchart of FIG. 3. Referring to FIG. 3, the handler program starts at block 70 wherein certain initialization may be performed, Thereafter, the program sequences through a number of decisional blocks 72, 74, 76, 78, 80 and 82 to decode the key status signal to determine which menu navigation action has been requested by the programmer unit 14. If the UP arrow key is activated, program execution will be diverted from block 72 to block 84 wherein the controller 20 will send instruction signals to the programmer unit 14 to move the pointer of the menu display image to the next row up. If the pointer is currently at its upper limit, either no action will take place or the pointer will circulate back to the lowest row. In the example menu image of FIG. 1A, if the UP arrow key is activated, the pointer will either remain pointing to the Speed parameter row or be circulated back to the Advanced Menu row. After the controller 20 transmits the instructions in block 84, it will return program flow back to block 54 of the flowchart of FIG. 2 awaiting the next key status signal.

Likewise, if the DOWN arrow key is activated, program execution will be diverted from block 74 to block 86 wherein the controller 20 will send instruction signals to the programmer unit 14 to move the pointer of the menu display image to the next row down. If the pointer is currently at its lower limit, either no action will take place or the pointer will circulate back to the highest row. In the example menu image of FIG. 1A, if the DOWN arrow key is activated, the pointer will be positioned down to the Response parameter row. After the controller 20 transmits the instructions in block 86, it will return program flow back to block 54 of the flowchart of FIG. 2 awaiting the next key status signal.

Once the desired parameter row is activated, the user may select the drive parameter value by depressing or activating the left or right keys on the programmer unit 14. If the left arrow key is activated, program execution will be diverted from block 76 to block 88 wherein the controller 20 will send instruction signals to the programmer unit 14 to highlight the next drive parameter value to the left of the current highlighted drive parameter value. In the example of FIG. 1A, if the Speed value at D2 is currently highlighted, then, if the left arrow key is activated, the Speed value at D1 will be highlighted and so on. If the Speed value at D1 is highlighted when the left arrow key is activated, then either no action will be taken or the highlighting may be circulated to the right-most Speed value at D4.

Likewise, if the right arrow key is activated, program execution will be diverted from block 78 to block 90 wherein the controller 20 will send instruction signals to the programmer unit 14 to highlight the next drive parameter value to the right of the current highlighted drive parameter value. In the example of FIG. 1A, if the Speed value at D1 is currently highlighted, then, if the right arrow key is activated, the Speed value at D2 will be highlighted . If the Speed value at D4 is highlighted when the right arrow key is activated, then either no action will be taken or the highlighting may be circulated to the left-most Speed value at D1. After the controller 20 transmits the instructions in either block 88 or block 90, it will return program flow back to block 54 of the flowchart of FIG. 2 awaiting the next key status signal.

Figure 4:
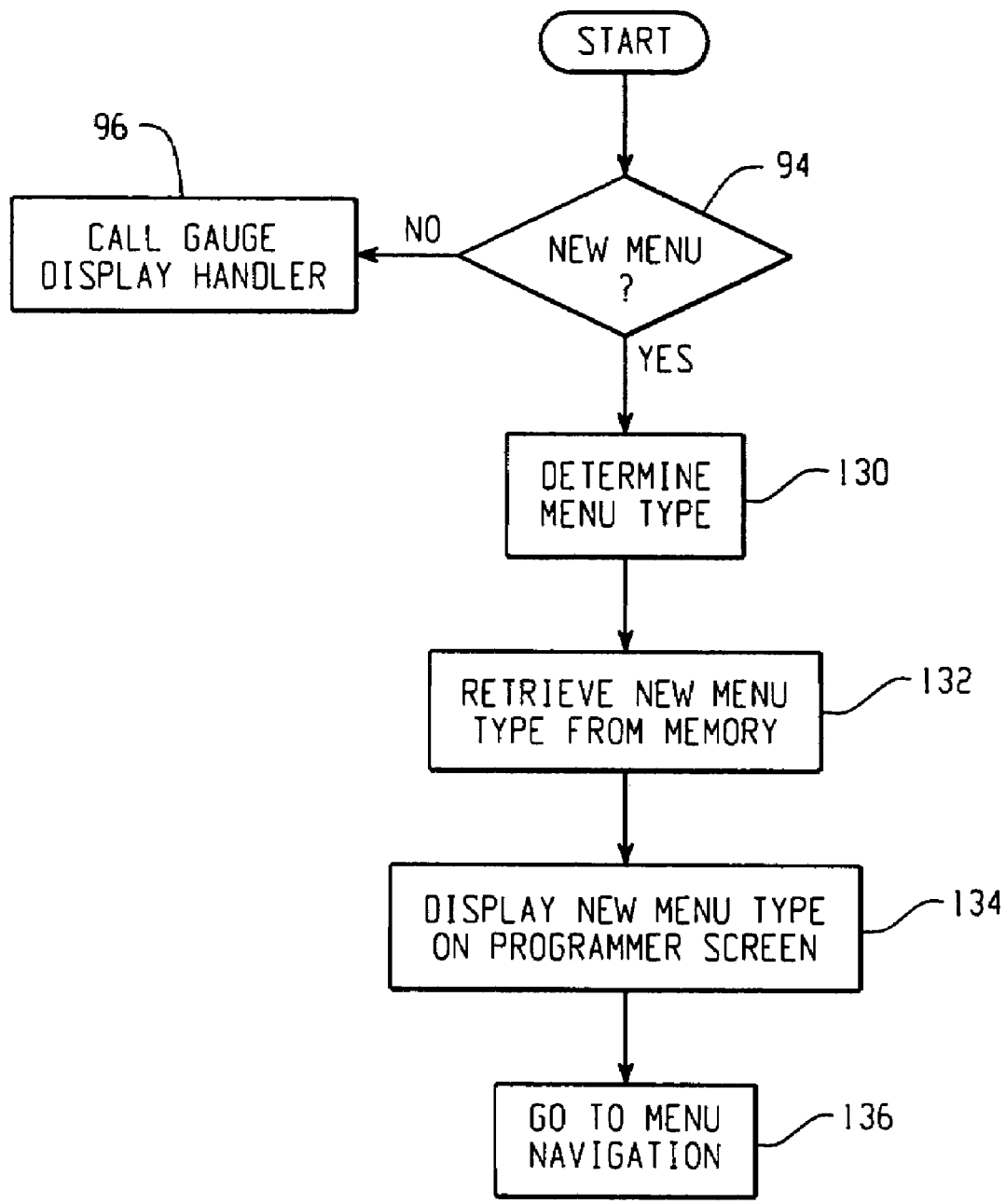

Once the proper row and/or column drive parameter value is selected, by highlighting or otherwise, the user may adjust the selected drive parameter to a new value or move to another menu screen image by activating the enter (E) key on the programmer unit. When the E key is activated, program execution is diverted from block 80 to block 92 wherein the appropriate handler program is called and executed by the controller 20. An exemplary handler program for performing the tasks of block 92 is shown by the flowchart of FIG. 4. Referring to FIG. 4, the handler program starts at decisional block 94 wherein it is determined if the request is for a new menu image or for parameter value adjustment. Suppose that in the example of FIG. 1A the pointer was pointing to the row "Advanced Menu" when the E key was activated, then program execution will continue through blocks or steps to display a new menu image on the programmer display 16 which will be discussed in greater detail herein below. Otherwise, the program will divert program flow from decisional block 94 to block 96 wherein a gauge display handler program is called and executed for the adjustment of the desired parameter value.

Figure 1B:
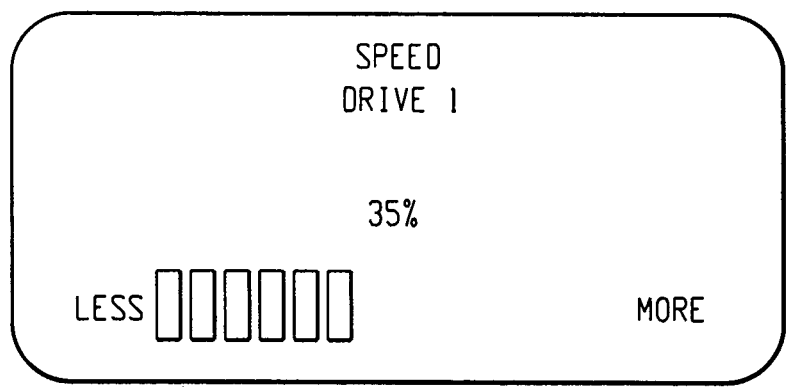
FIG. 1B is one example of a gauge display window for display on an interactive display screen.
Figure 1C:
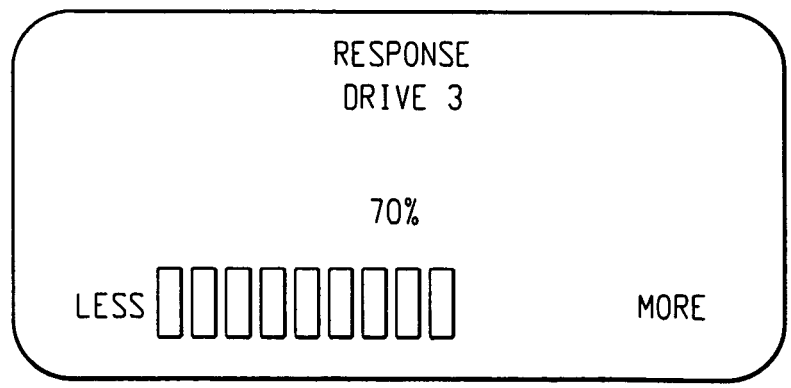
FIG. 1C is another example of a gauge display window for display on an interactive display screen.
Figure 5:
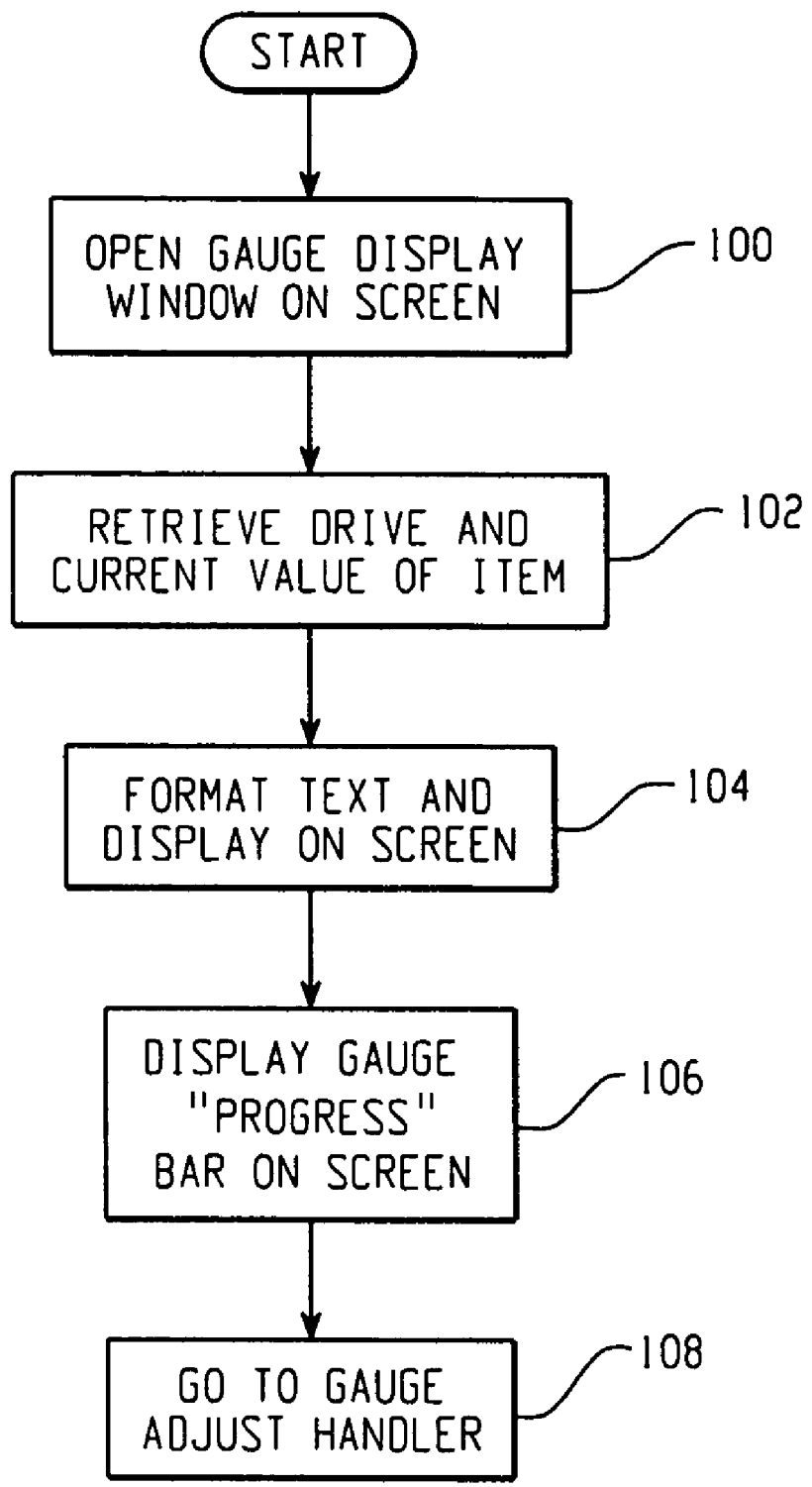

An exemplary gauge display handler program is shown in the flowchart of FIG. 5. Referring to FIG. 5, the program starts at block 100 wherein the controller 20 transmits instructions to the programmer unit 14 via lines 22 to open a gauge display window in the screen 16. Examples of gauge display windows are shown in FIGS. 1B and 1C. Next, in block 102, the program retrieves the drive and current values of the desired item or parameter from memory. In block 104, the program formats the text of the selected drive and parameter and sends instructions and data to the programmer unit 14 to display the formatted text and current drive and parameter values in the gauge display window. In the example of FIG. 1B, the Speed parameter for drive 1 is selected and the current value is 35%, and in the example of FIG. 1C, the Response parameter for drive 3 is selected and the current value is 70%.

Next, in block 106, the program sends instructions and data for a "progress" bar to be displayed on the screen 16, preferably in the lower portion of the gauge display window. Each progress bar display image may include the text "LESS" and "MORE" at the far left and right, respectively, thereof as shown in the examples of FIGS. 1B and 1C. In between the text, there may be displayed a row of blocks with each block representing an incremental percentage of the displayed parameter value. Accordingly, as the parameter value is increased, additional blocks will appear along the row of the progress bar consistent with the increase in value. Likewise, as the parameter value is decreased, blocks will disappear along the row of the progress bar consistent with the decrease in value. So, the progress bar appears as a thermometer for the value of the adjusted parameter.

Once the proper gauge window is fully formatted and displayed on the screen 16, the user is ready to adjust or program the value of the selected parameter. To accomplish this task, program execution is directed to a gauge adjustment handler program in block 108. An exemplary gauge adjust handler program is shown in the flowchart of FIG. 6 and is executed in conjunction with the program of FIG. 2.

Figure 6:
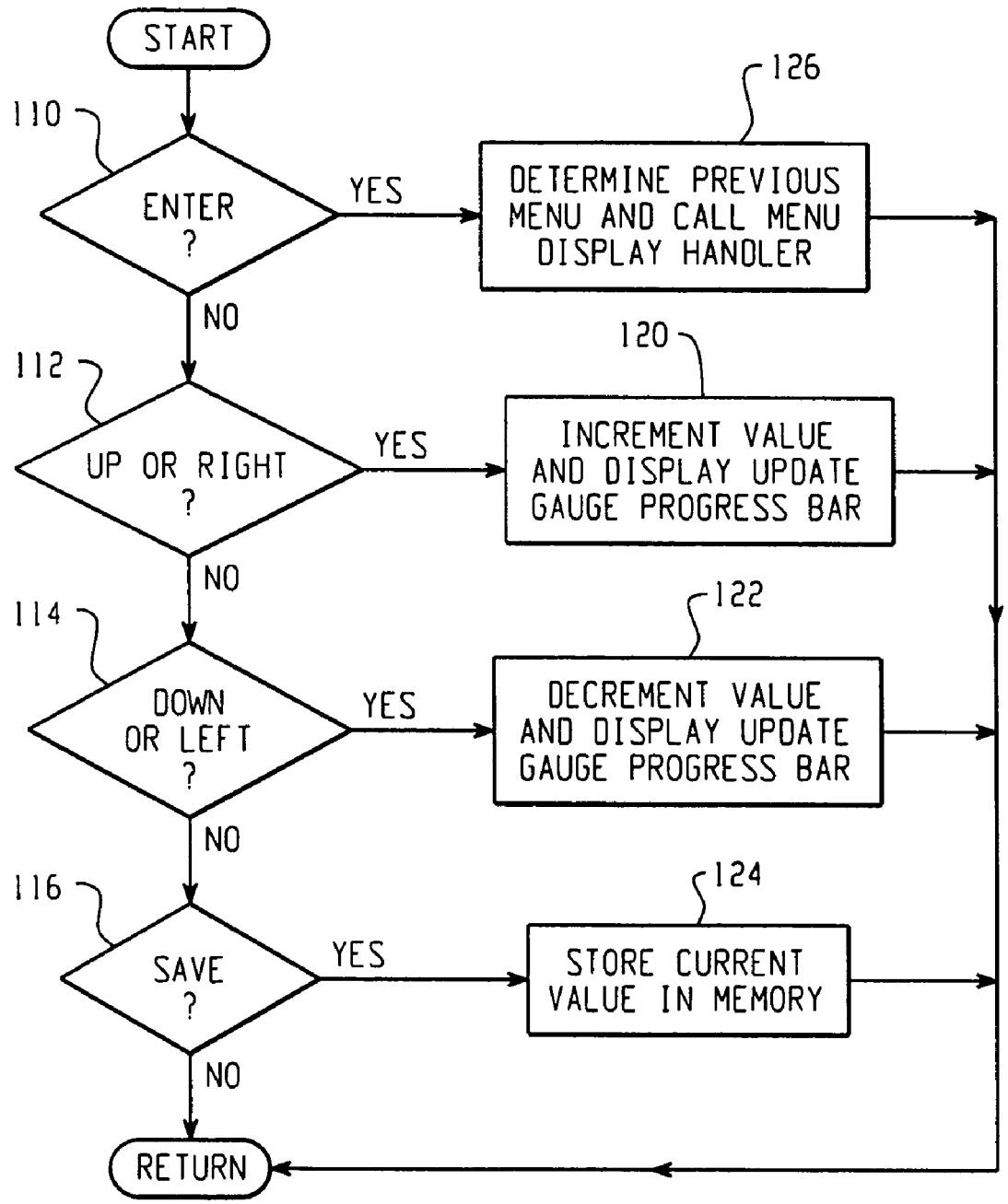

Referring to FIGS. 2 and 6, the gauge adjust handler program goes through a number of decisional blocks 110, 112, 114 and 116 to decode the key status signal received at block 54. So long as no keys of the programmer unit 14 are activated by the user, program execution will pass through decisional blocks 110, 112, 114 and 116 and be returned to block 54 for the next key status signal. With each reception of a key status signal, program execution is directed back to the gauge adjust handler program by the block or step 60 which has knowledge that the program is in a parameter adjust mode. When an up or right arrow key is activated, program execution is directed from block 112 to block 120 wherein the parameter value is incremented a predetermined amount, the new value is displayed numerically and the gauge progress bar is updated. Likewise, when a down or left arrow key is activated, program execution is directed from block 114 to block 122 wherein the parameter value is decremented a predetermined amount, the new value is displayed numerically and the gauge progress bar display is updated. This may be visualized by the examples of FIGS. 1B and 1C.

Once the selected drive parameter has been adjusted to the desired value using the interactive gauge window (see FIGS. 1B and 1C), then the user may activate the Save key which causes the program to direct execution from block 116 to 124 wherein the program stores the new value of the selected drive parameter in a designated memory location. Then, the current menu screen may be updated with the new drive parameter value and the gauge display window may be closed. If another drive parameter of the currently displayed menu table is to be adjusted, then the foregoing described process is repeated. The process may be repeated for all drive parameters on the displayed menu table desired to be adjusted. Thus, a plurality of drive parameters displayed in a common menu image may be adjusted to desired values by navigation through the common menu image without having to change from one menu image to another.

After all of the selected drive parameters of the displayed common menu table have been adjusted to the desired values, the user may activate the Enter key, for example, which causes the program to direct execution in the program of FIG. 6 from block 110 to block 126 wherein the program determines the common menu that is displayed on screen 16 for drive parameter adjustment and directs execution to the menu display handler exemplified by the flowchart of FIG. 4.

Referring back to FIG. 4, in block 94 the program determines whether the request is for display of a menu image or a gauge window image. When the routine of FIG. 4 is called by block 126 as noted above, the request is for a menu image display. Therefore, program execution is directed from block 94 to block 130. In the present example, if the current menu image on screen 16 is the main menu exemplified by FIG. 1A, then, in block 130, the program retains display of the main menu. Otherwise, in block 130, the program determines the menu type or image to be displayed according to a predetermined routing which will be explained in more detail herein below. The image data of the desired menu according to the routing is retrieved from memory by block 132 and transmitted to the programmer unit 14 via lines 22 with instructions to display the menu image on screen 16 by block 134. Thereafter, the program directs program execution to the menu navigation flowchart of FIG. 3 by block 136.

Figure 7A:
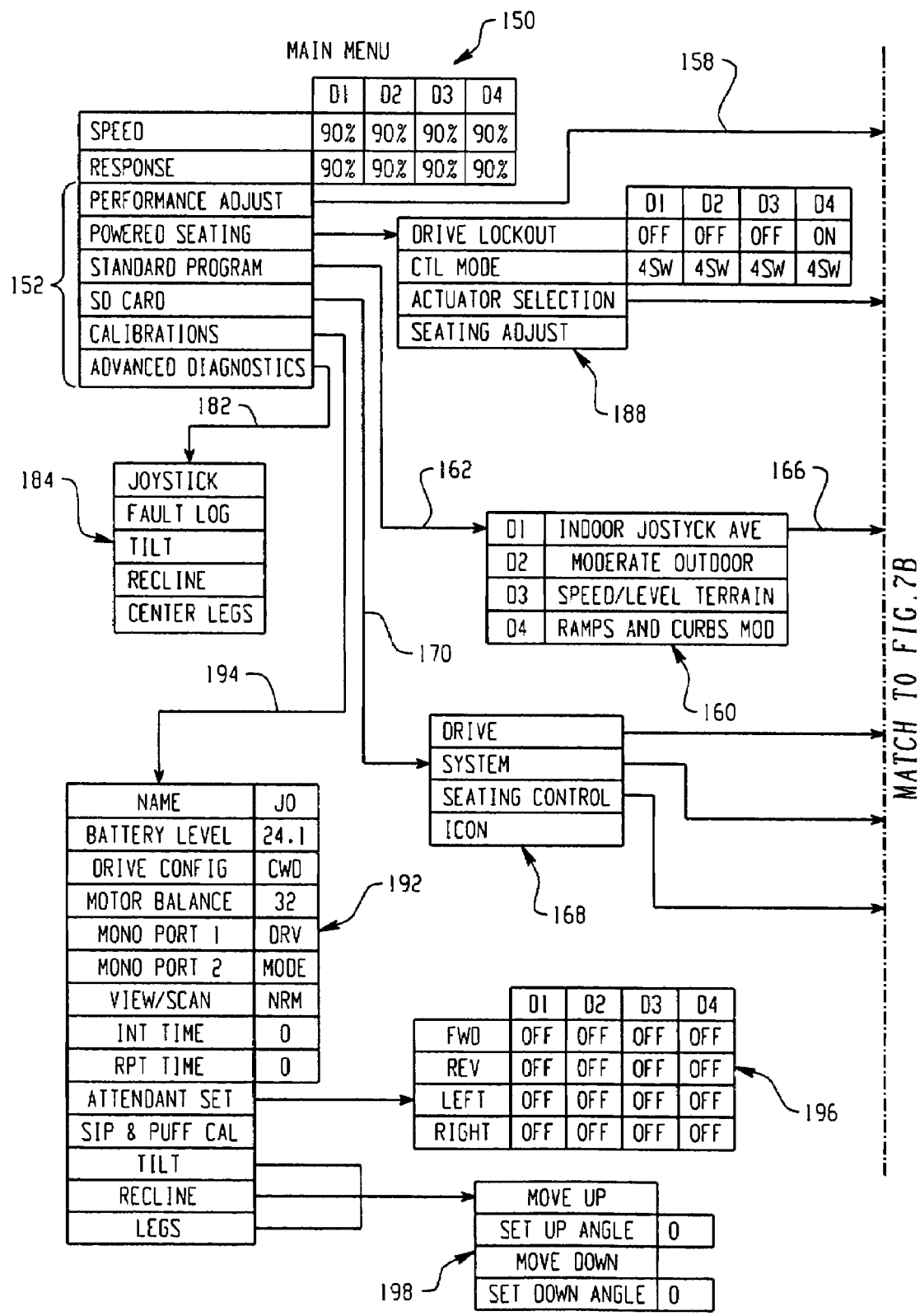
FIGS. 7A and 7B compositely depict a flowchart exemplifying menu images for display on an interactive display screen and predetermined navigational routings between menu images.
Figure 7B:
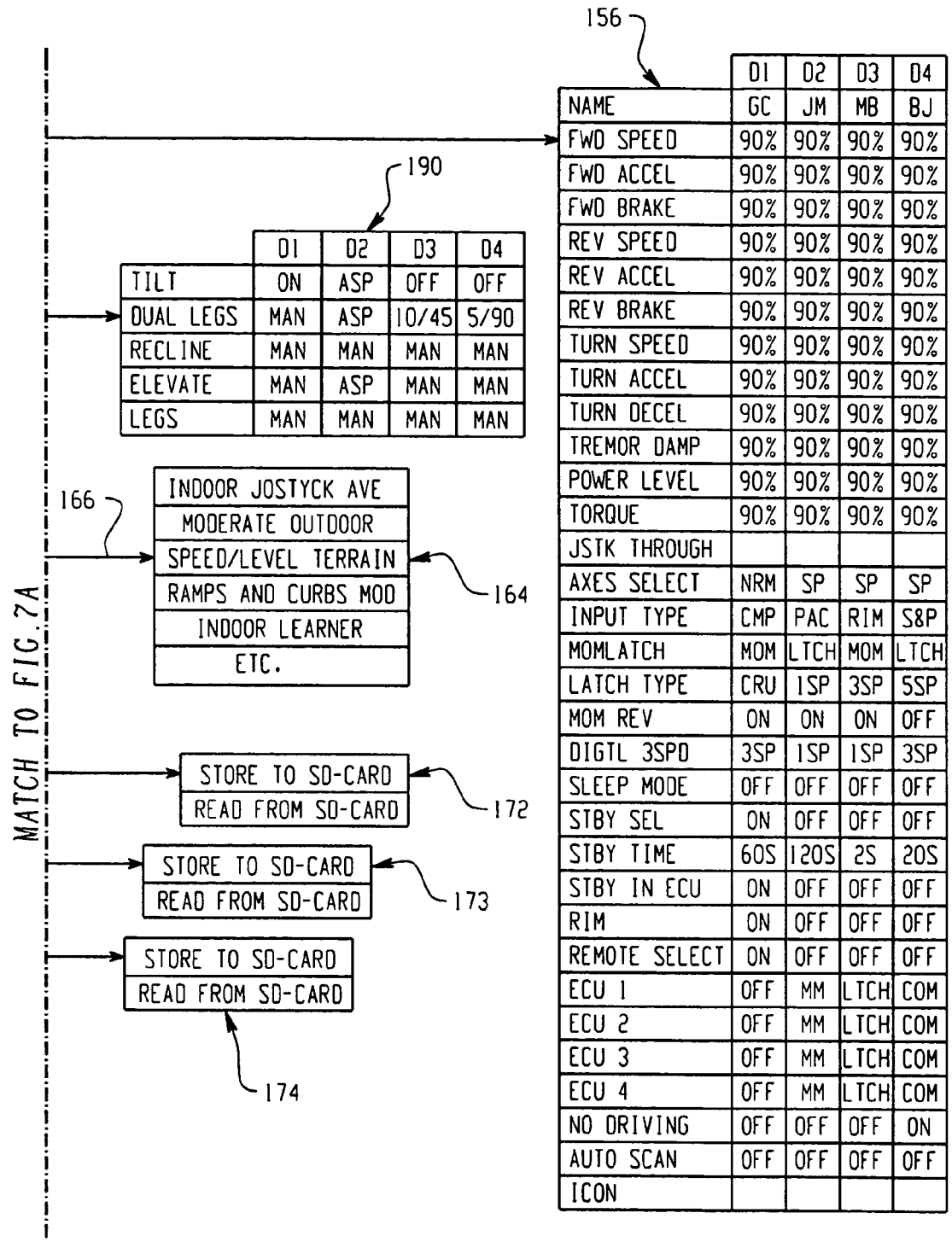

It is understood that the main menu is not the only menu image for display on the screen 16 for performing the task of programming. In the present embodiment, there is a multiplicity of menu images of drive parameters which may be displayed on screen 16 according to a predetermined routing or order. The flowchart of FIG. 7 exemplifies a multiplicity of menu image screen displays and the predetermined routings between display images which are designated by arrowed lines. All of the menu image examples of FIG. 7 are depicted in a table format, but it is understood that other formats may be used just as well. In the example of FIG. 7, a main menu image 150 includes Speed and Response rows as noted above in connection with the description of FIG. 1A, but the Advanced Menu row of the menu image of FIG. 1A may be replaced in the main menu 150 with additional rows 152 from which selections may be made for routings to other menus using the menu navigation program as described above in connection with FIG. 3. By keying the enter button (E) as described herein above, program execution is directed to the flowchart of FIG. 4 to display the selected menu image on the screen 16. In the present example, the additional rows 152 include: Performance Adjust, Powered Seating, Standard Program, SD Card, Calibrations, and Advanced Diagnostics.

Once the main menu image 150 is displayed on screen 16, the user may select any row of rows 152 to display another menu image defined by the predetermined routing illustrated by the arrowed lines. For example, if the user selects the Performance Adjust row and hits enter, then a table of performance parameters 156 will be displayed on screen 16 according to the routing 158. The exemplary table 156 may include all of the performance parameter values for all of the drives D1-D4 of the powered wheelchair. It is understood that the display screen 16 may be limited to display only a window of a predetermined number of contiguous rows of table 156, like 6 or 7 rows, for example, at a time. But, the user may scroll the window image up or down using the up or down keys of the programmer unit 14 to view, and thus, select and program or adjust additional drive parameter values as described herein above. Also, in the present embodiment, not all of the performance parameter settings are numerical, rather some may be switched between ON and OFF, and normal (NRM) and special (SP), for example.

In the present embodiment, the user may select any of the additional menu images from the additional rows 152 of the main menu image 150 on screen 16. For example, if the user selects the Standard Programs row, a drive menu image 160 will be displayed on screen 16 according to routing 162 and from the menu image 160, if the user selects the D1 row, then an indoor joystick drive image 164 will be displayed on screen 16 according to routing 166. Further, the user may select row SD Card from the main menu 150 to display menu image 168 according to routing 170. In addition, from menu image 168, the user may select for display additional menu images 172, 173 and 174 for storing selected parameter settings to and reading selected parameter values from an SD Card, for example. From menu images 172, 173 and 174 the user may select for display other possible menu images (not shown).

Further, the user may select the Advanced Diagnostics row of image 150 for display of menu image 184 according to routing 182, for example. Still further, the user may select the Power Seating row for the display of a menu image 188 which includes a table of the drive settings for drive lockouts and control modes. The user may select an actuator selection row from menu image 188 for display of a menu image 190 from which all of the seat position actuators of the wheelchair, like tilt, dual legs, recline, elevate and legs, for example, may be programmed or adjusted for all of the drives D1-D4. Accordingly, when a drive actuator setting is selected from the menu image 188, another menu 190 will appear on screen 16 for the selection of the desired setting. Beyond that everything else will remain substantially as described herein above.

Further yet, the user may select the Calibrations row in menu image 150 for the display of yet another menu image 192 according to routing 194 for setting additional parameters. From the menu image 192, the user may select another menu image 196 from the Attendant Set row thereof to turn "ON" and "OFF" the parameter settings FWD, REV, LEFT and RIGHT for all of the drive modes D1-D4. A further menu image 198 may be displayed from any of the rows Tilt, Recline or Legs on the menu image 192.

Once in a menu image display, a user may return the display 16 to one or more previous menu images through activation of a designated pushbutton on the programmer unit 14 using the menu navigation program of FIG. 3, for example. In the flowchart of FIG. 6 of the present embodiment, if the user activates the Enter pushbutton after programming all of the desired drive parameters of a current menu screen, program execution will divert from block 110 to block 126 wherein the program will execute the handler program of FIG. 4 for the previous menu image or type according to the predetermined routing. For example, if the menu image 156 is being displayed on screen 16, then, if the user activates the Enter key, the display 16 will be returned to the main menu image 150 according to routing 158. Thus, by a manipulation of the keys 18 of the programmer unit 14, the user may navigate forward or backward among the various menu images shown in FIG. 7 for display on the screen 16 according to the designated routing thereof.

In addition, while pushbutton keys are used in the present embodiment for activating programming functions and tasks, it is understood that other implementations may be used just as well. For example, a joystick having forward, backward, right and left movements may be used in place of the pushbutton keys to perform the same or similar functions. Likewise, the programmer unit 14 of the present embodiment is described as being coupled to the controller 20 via a serial communication controller 24, but it may be coupled to the controller 20 over a serial bus structure, like a CAN bus structure, or wirelessly without deviating from the broad principles of applicants' general concept.

Use of the exemplary methods and apparatus should be readily apparent from the discussions above. In the exemplary embodiment, a user connects the programmer unit 14 to the control system 10 of the power wheelchair, and presses the power I/O (P) button. A coded signal indicative of the P button being depressed is transmitted over lines 22 to the controller 20. In response, the controller 20 generates appropriate menu images which are transmitted to unit 14 via lines 22 for display on the display screen thereof. Certain of the menu images include parameter values for all drive modes on a common menu screen. A user may use buttons 18 to select one of these menu images and to access, adjust, and save to memory 28, 32 (i.e. program) parameter values of any of the drive modes from the selected single menu screen. Thereafter, the user may select other menu images via programming unit 14 for programming other drive parameters or disconnect the programming unit form the controller so that the wheelchair may be operated in conjunction with the programmed parameters.

In an alternate embodiment, the programming functions of the programmer unit 14 may be integrated into the microcontroller 20 which may be contained in a multi-function joystick unit or display unit of the wheelchair. The joystick unit and the display unit will each include an interactive display screen, which may be similar to the display screen 16, coupled to the microcontroller 20. If a display unit is used, it may include pushbuttons similar to the pushbuttons 18 which will be used in the same manner as described for the programmer unit 14 above to interact with the menu images of the display screen. If a joystick unit is used, the positioning of the joystick may replace the pushbuttons 18 for interacting with the menu images of the display screen. Thus, either a joystick unit or a display unit of the wheelchair may be used in the alternative to perform the programming functions as described supra for programming parameter values for the different drive modes into the control system of the wheelchair.

While one or more exemplary embodiments have been provided herein, it is understood that these embodiments are presented merely for purposes of illustration and are in no way intended to be limiting to the present invention. Modifications may appear to all those skilled in the art. Accordingly, applicants' invention should not be limited in any way by such embodiments, but rather construed in breadth and broad scope in accordance with the recitation of the claims appended hereto.

What is claimed is:

1. Method of programming parameters of a power driven wheelchair for a plurality of drive modes, said method comprising:
    displaying a menu image on an interactive display screen, said menu image including names and values of a plurality of wheelchair parameters for a plurality of drive modes of the wheelchair;
    selecting a wheelchair parameter value for a drive mode from the displayed menu image; in response to the selecting, opening a window on the interactive display screen to program the selected wheelchair parameter value while continuing to display names and values of at least the select wheelchair parameter for the plurality of drive modes in the menu image; and
    programming the value of said selected wheelchair parameter to a desired value.

2. The method of claim 1 wherein the step of programming includes:
    adjusting a value of the selected wheelchair parameter to a desired value; and
    updating the menu image with the adjusted value of the selected wheelchair parameter.

3. The method of claim 2 including saving the adjusted value of the selected wheelchair parameter in a designated memory location.

4. The method of claim 2 wherein the step of adjusting includes:
    opening a window within the interactive display screen for displaying the value of the selected parameter in a predetermined format; and
    adjusting the value of the selected parameter to the desired value using said format of the window display.

5. The method of claim 4 wherein the window format is displayed with a numerical value of the selected parameter; and wherein said numerical value of the window display is adjusted to the desired value.

6. The method of claim 4 wherein the window format is displayed with a graphic gauge depiction of the selected parameter value thereof; and wherein said graphic gauge display of parameter value within the window display is adjusted to the desired value.

7. The method of claim 4 including closing the window display after the parameter value has been adjusted to the desired value.

8. The method of claim 1 including programming the value of said selected wheelchair parameter to the desired value using the displayed menu image.

9. The method of claim 1 including:
    storing a plurality of menu images in a memory, each menu image including names and values of a plurality of wheelchair parameters for a plurality of drive modes of the wheelchair; and
    displaying menu images from said plurality of stored menu images on the interactive display screen according to a predetermined routing.

10. The method of claim 1 wherein the menu image is displayed in a table format with rows of wheelchair parameters and columns of drive modes.

11. Apparatus for programnhing parameters of a power driven wheelchair for a plurality of drive modes, said apparatus comprising:
    a display;
    a controller for interacting with said display and operative to display a menu image on a screen of said display, said menu image including names and values of a plurality of wheelchair parameters for a plurality of drive modes of the wheelchair; and one or more input devices operative to interact with said controller and said display to select a wheelchair parameter value for a drive mode from the displayed menu images and to program the value of said selected wheelchair parameter to a desired value;

wherein the controller is operative to open a window on the display for programming the selected wheelchair parameter value in response to selection of said wheelchair parameter value such that names and values of at least the select wheelchair parameter for the plurality of drive modes continue to be displayed in the menu image.

12. The apparatus of claim 11 wherein the programming unit is operative to control the controller to adjust a value of the selected wheelchair parameter to a desired value, and to update the displayed menu image with the adjusted value of the selected wheelchair parameter.

13. The apparatus of claim 12 wherein the programming unit is operative to control the controller to save the adjusted value of the selected wheelchair parameter in a designated memory location.

14. The apparatus of claim 12 wherein the programming unit is operative to control the controller to open a window within the screen of the display for displaying the value of the selected parameter in a predetermined format, and to adjust the value of the selected parameter to the desired value using said format of the window display.

15. The apparatus of claim 14 wherein the programming unit is operative to control the controller to display the selected parameter in the window format with a numerical value, and to adjust said numerical value of the window display to the desired value.

16. The apparatus of claim 14 wherein the programming unit is operative to control the controller to display the selected parameter in the window format with a graphic gauge depiction, and to adjust said graphic gauge depiction of the window display to the desired value.

17. The apparatus of claim 14 wherein the programming unit is operative to control the controller to close the window display after the parameter value has been adjusted to the desired value.

18. The apparatus of claim 1 including: a memory for storing a plurality of menu images in a memory, each menu image including names and values of a plurality of wheelchair parameters for a plurality of drive modes of the wheelchair; and wherein the programming unit is operative to control the controller to display menu images from said plurality of stored menu images on the screen of the display according to a predetermined routing.

19. The apparatus of claim 18 wherein the programming unit is operative to control the controller to display a main menu image on the screen of the display, and to select for display other menu images of the stored plurality from the main menu image.

20. The method of claim 1, further including:
closing the window on the interactive display screen after the selected wheelchair parameter value is programmed while continuing to display names and values of the plurality of wheelchair parameters for the plurality of drive modes in the menu image.

21. The method of claim 1 wherein the interactive display screen forms at least a portion of a control unit for the power driven wheelchair.

22. The method of claim 1 wherein the interactive display screen forms at least a portion of a programmer unit associated with the power driven wheelchair.

23. The apparatus of claim 11 wherein the controller is operative to close the window on the display after the selected wheelchair parameter value is programmed such that names and values of the plurality of wheelchair parameters for the plurality of drive modes continue to be displayed in the menu image.

24. The apparatus of claim 11 wherein the display, controller, and one or more input devices fonn at least a portion of a control unit for the power driven wheelchair.

25. The apparatus of claim 11 wherein the display and one or more input devices form at least a portion of a programmer unit associated with the power driven wheelchair.

26. A method associated with a power driven wheelchair for setting or modifying a programming parameter, including:

a) displaying a menu image on an interactive display screen of a control unit for the power driven wheelchair, said menu image including names and values of a plurality of wheelchair parameters for a plurality of drive modes of the wheelchair;

b) selecting a wheelchair parameter for a select drive mode from the displayed menu image using one or more input devices of the control unit; and c) selecting a desired value for the selected wheelchair parameter of the select drive mode using the one or more input devices while continuing to display names and values of at least the selected wheelchair parameter for the plurality of drive modes in the menu image.

27. The method of claim 26, further including:

d) in response to the selecting in b), opening a window on the interactive display screen to facilitate the selecting in c).

28. The method of claim 27, further including:

e) in response to the selecting in c), closing the window on the interactive display screen while continuing to display names and values of the plurality of wheelchair parameters for the plurality of drive modes in the menu image.

29. An apparatus associated with a power driven wheelchair for setting or modifying a programmable parameter, including:

a display;

a controller for interacting with said display and operative to display a menu image on a screen of said display, said menu image including names and values of a plurality of wheelchair parameters for a plurality of drive modes of the wheelchair; and one or more input devices operative to interact with said controller and said display to select a wheelchair parameter for a select drive mode from the displayed menu image and to select a desired value for the selected wheelchair parameter of the select drive mode while continuing to display names and values of at least the selected wheelchair parameter for the plurality of drive modes in the menu image;

wherein the display, controller, and one or more input devices form at least a portion of a control unit for the power driven wheelchair.

30. The apparatus of claim 29 wherein the controller is operative to open a window on the display for selecting the desired value for the selected wheelchair parameter of the select drive mode in response to selection of said wheelchair parameter such that names and values of at least the selected wheelchair parameter for the plurality of drive modes continue to be displayed in the menu image.

31. The apparatus of claim 30 wherein the controller is operative to close the window on the display after the desired value for the selected wheelchair parameter of the select drive mode is selected such that names and values of the plurality of wheelchair parameters for the plurality of drive modes continue to be displayed in the menu image.

* * * * *